No. 714,381. Patented Nov. 25, 1902.
C. W. A. KOELKEBECK.
SEPARATOR.
(Application filed Mar. 5, 1900.)
(No Model.) 6 Sheets—Sheet 1.

WITNESSES:
O. D. Thompson
Edward B. Vaill

INVENTOR:
Carl W. A. Koelkebeck
by W. H. Doolittle
ATTORNEYS

No. 714,381. Patented Nov. 25, 1902.
C. W. A. KOELKEBECK.
SEPARATOR.
(Application filed Mar. 5, 1900.)
(No Model.) 6 Sheets—Sheet 2.

WITNESSES:
O. D. Thompson.
Edward B. Veach

INVENTOR:
Carl W. A. Koelkebeck
by W. H. Doolittle Son
ATTORNEYS.

No. 714,381. Patented Nov. 25, 1902.
C. W. A. KOELKEBECK.
SEPARATOR.
(Application filed Mar. 5, 1900.)
(No Model.)
6 Sheets—Sheet 3.

WITNESSES:
O. D. Thompson
Edward B. Vaill

INVENTOR.
Carl W. A. Koelkebeck
by H. H. Doolittle
ATTORNEYS.

No. 714,381. Patented Nov. 25, 1902.
C. W. A. KOELKEBECK.
SEPARATOR.
(Application filed Mar. 5, 1900.)
(No Model.)                                                                 6 Sheets—Sheet 4.
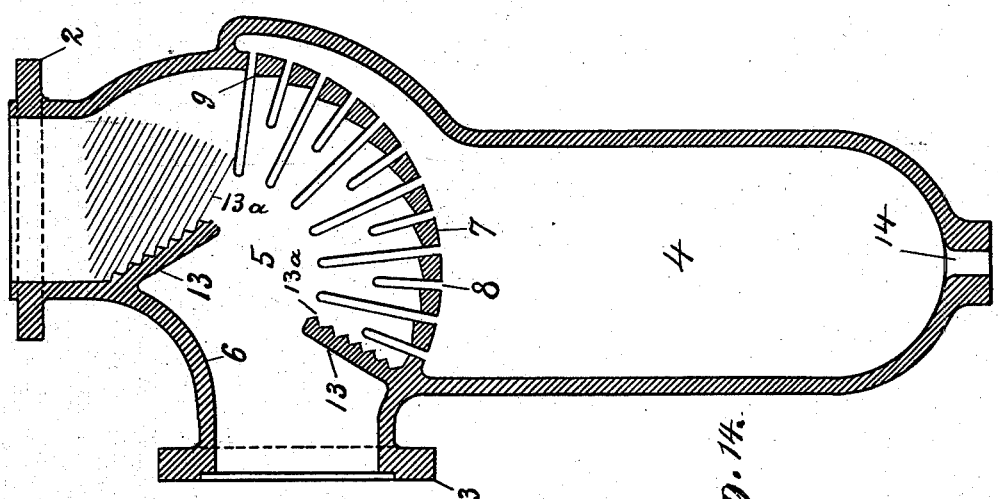
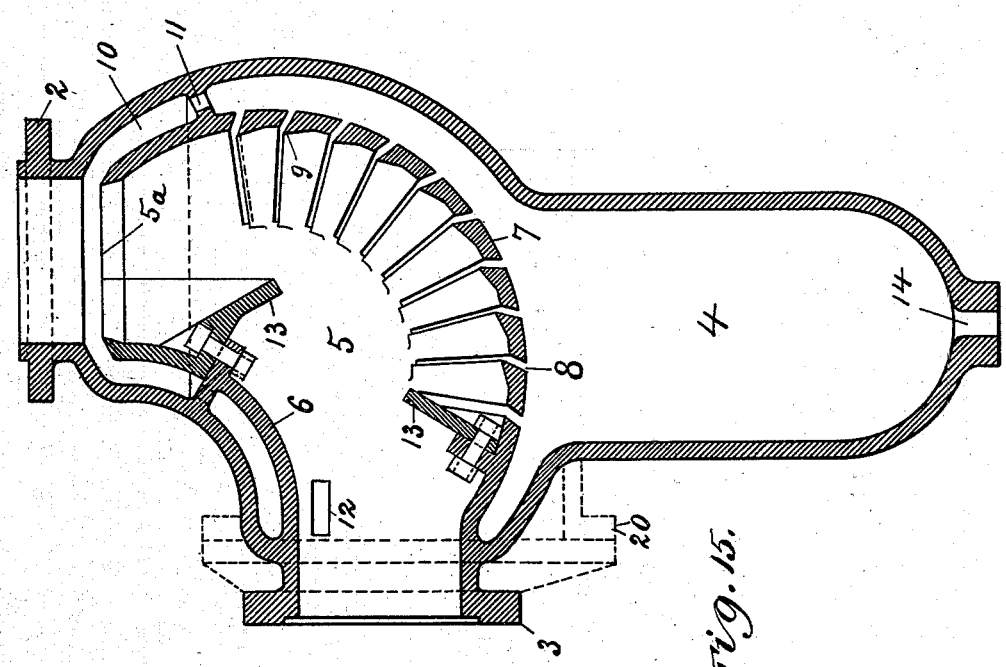
WITNESSES:
O. D. Thompson
Edward B. Vail
INVENTOR:
Carl W. A. Koelkebeck
by W. H. Doolittle & Son
ATTORNEYS.

No. 714,381. Patented Nov. 25, 1902.
C. W. A. KOELKEBECK.
SEPARATOR.
(Application filed Mar. 5, 1900.)
(No Model.) 6 Sheets—Sheet 6.

WITNESSES.

INVENTOR:

ATTORNEYS.

UNITED STATES PATENT OFFICE.

CARL W. A. KOELKEBECK, OF PITTSBURG, PENNSYLVANIA.

SEPARATOR.

SPECIFICATION forming part of Letters Patent No. 714,381, dated November 25, 1902.

Application filed March 5, 1900. Serial No. 7,398. (No model.)

*To all whom it may concern:*

Be it known that I, CARL W. A. KOELKEBECK, a citizen of the United States, residing at Pittsburg, in the county of Allegheny and State of Pennsylvania, have invented certain new and useful Improvements in Separators, of which the following is a specification, reference being had therein to the accompanying drawings.

The object of my invention is to provide new and improved means for separating and removing water, grease, and other particles from a current of steam and to collect and carry off the water in the pipe or pipes caused by condensation, so as to furnish dry steam to the engine or other steam-using apparatus.

To this end my invention consists of a new and improved separator or eliminator and in the construction and arrangement of parts, all as fully hereinafter described.

Figure 3:
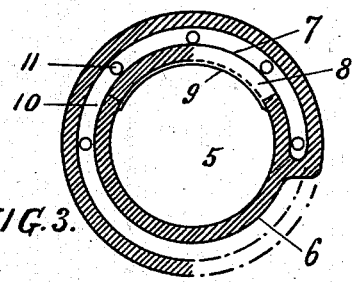
Figure 4:
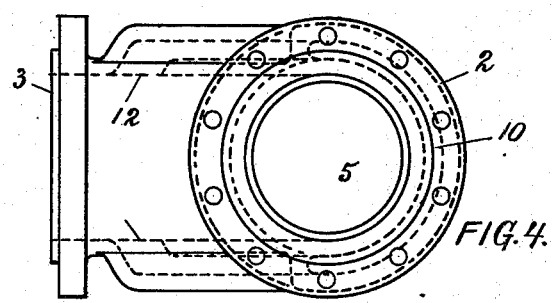
Figure 2:
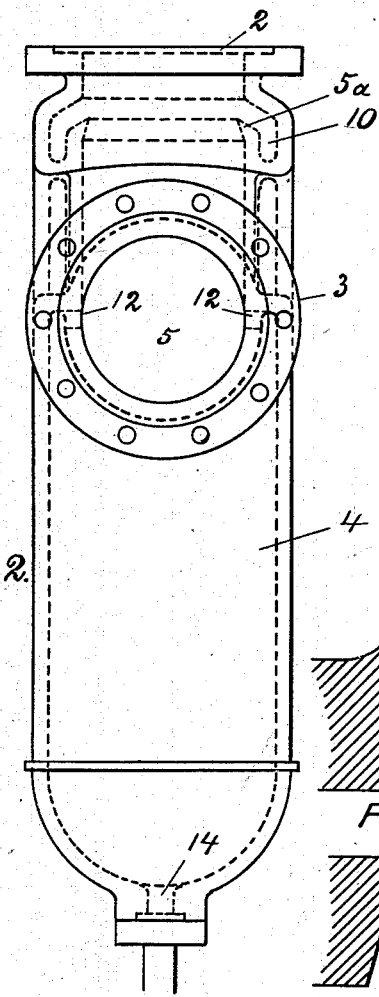
Figure 1:
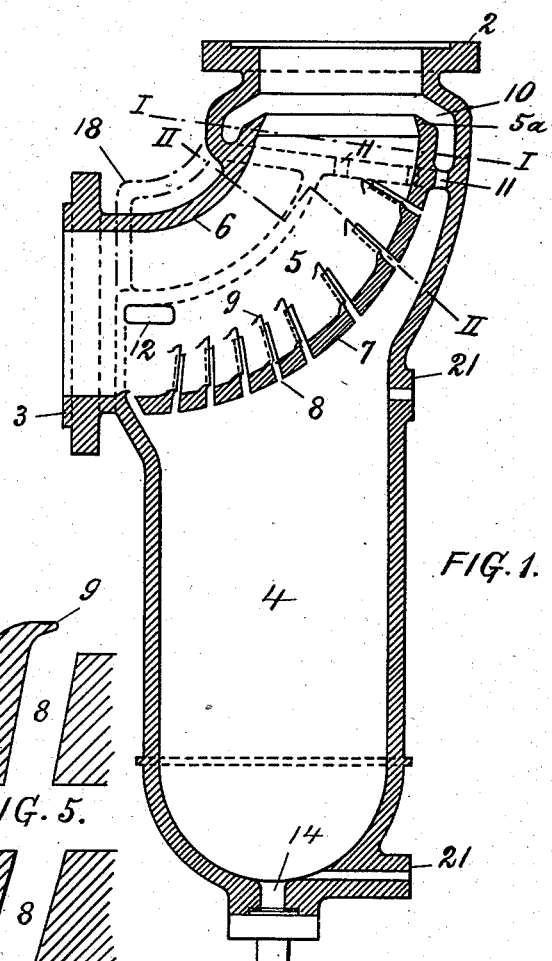
Figure 5:
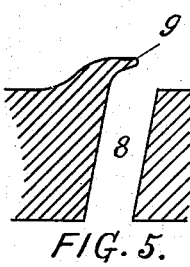
Figure 6:
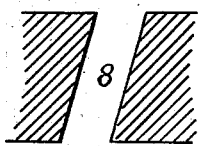
Figure 7:
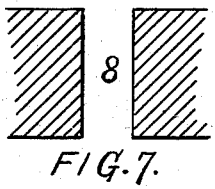
Figure 8:
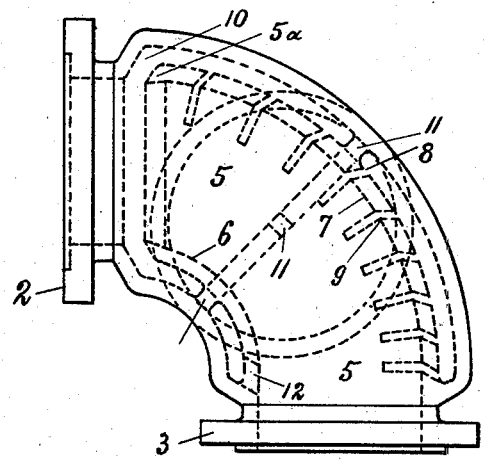
Figure 10:
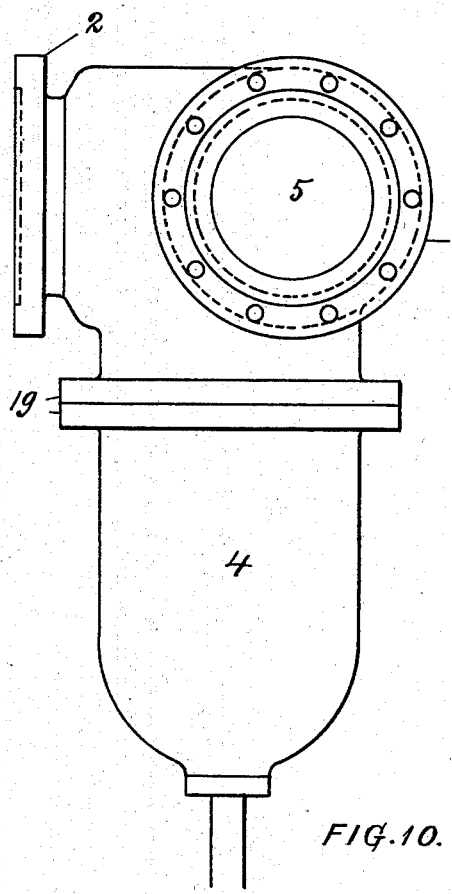
Figure 9:
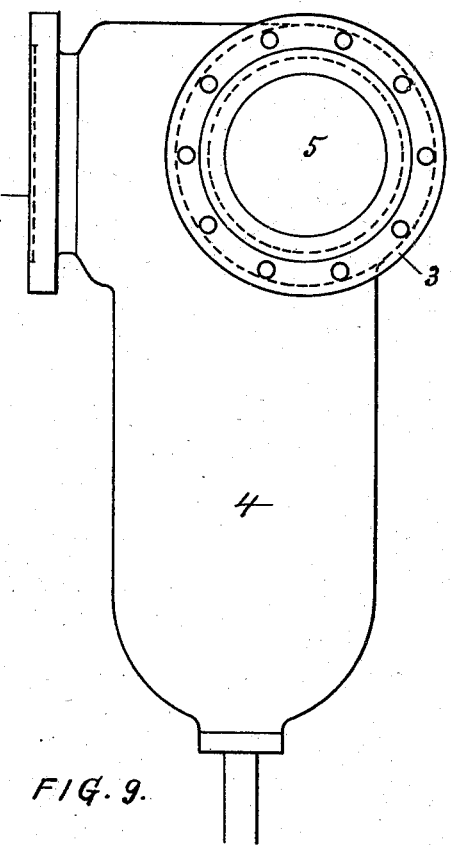
Figure 13:
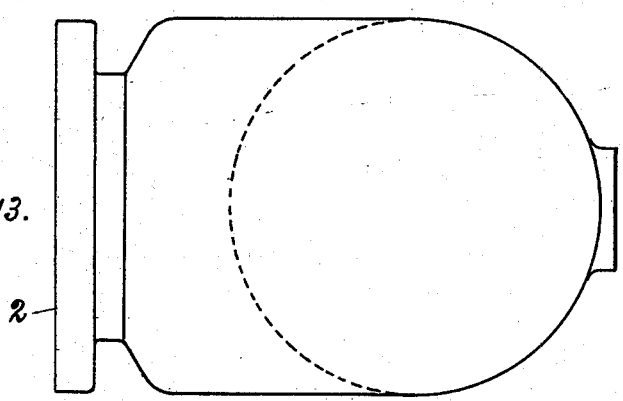
Figure 12:
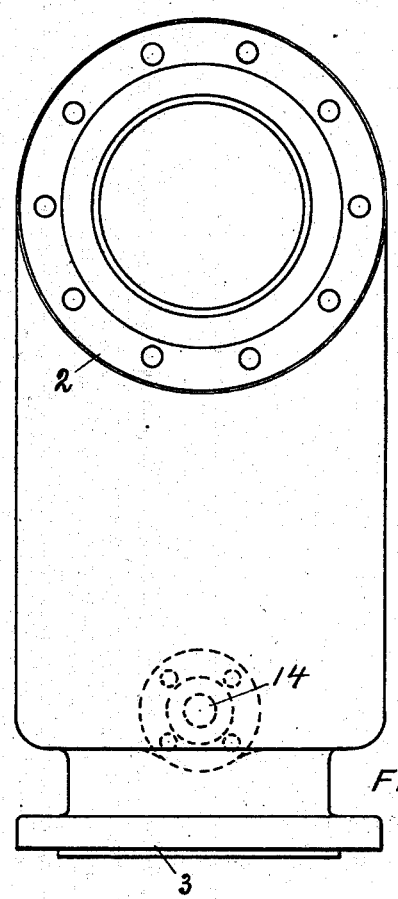
Figure 11:
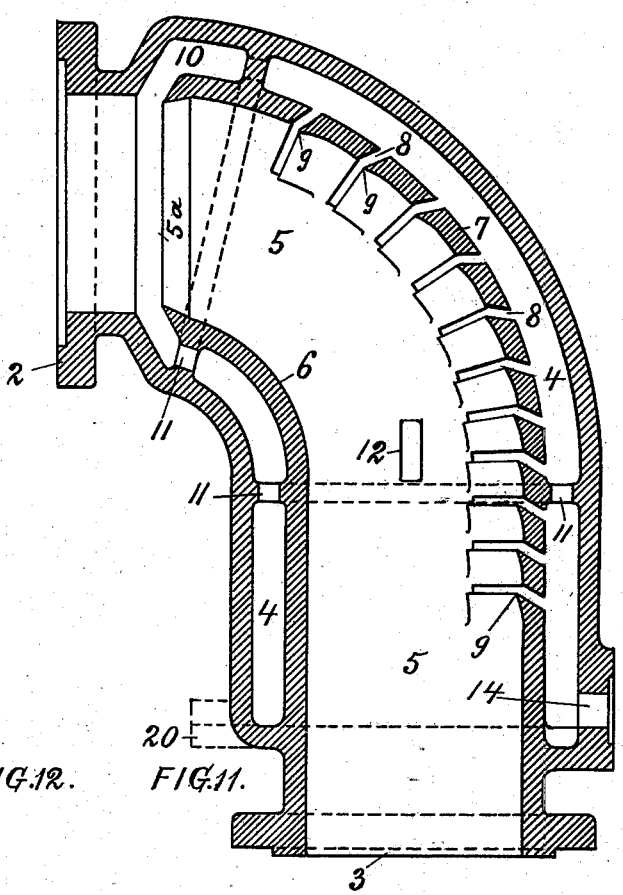
Figure 16:
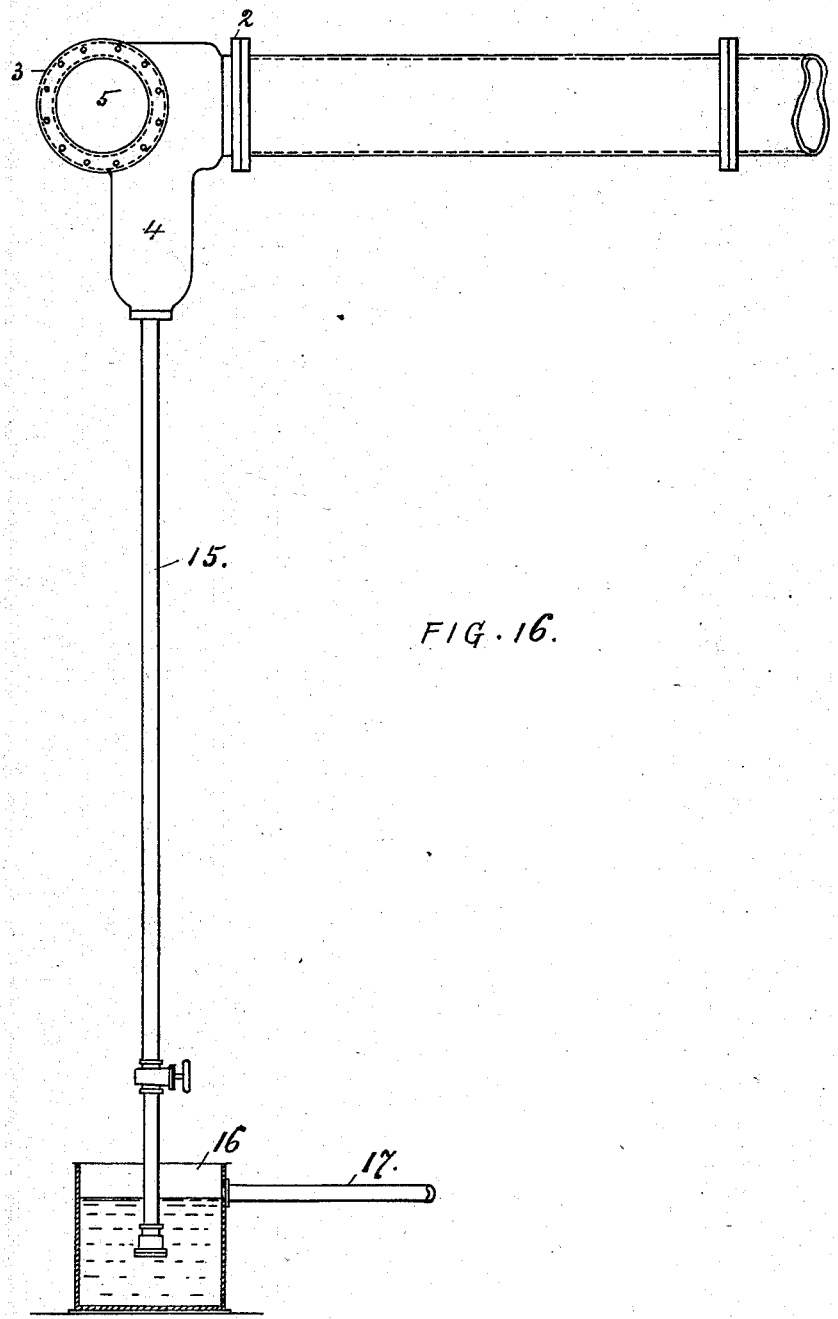

In the accompanying drawings, which illustrate applications of my invention, Figure 1 is a central vertical sectional view of a separator embodying my invention; Fig. 2, a side elevational view; Fig. 3, a cross-sectional view, part of it being a section on lines I I and part a section taken on line II II of Fig. 1; Fig. 4, a plan; Figs. 5, 6, and 7, detailed sectional views of openings or passages from the main steam-passage to the receiver; Fig. 8, a plan of a modified form; Figs. 9 and 10, side elevational views of the form shown by Fig. 8; Fig. 11, a central vertical section of another form; Fig. 12, an elevational view, and Fig. 13 a plan, of the form of Fig. 11; Fig. 14, a sectional view showing baffle-plates; Fig. 15, a modified form showing baffle-plates; Fig. 16, an elevational view of a separator or eliminator embodying my invention, shown in connection with an exhaust-pipe; and Fig. 17, a vertical sectional view of a further modified form.

In all of the several forms of separators illustrated the shape is similar to that of an ordinary elbow employed for coupling two pipes together. This shape is very desirable, for by its employment as a coupler it dispenses with the customary extra joints and their accompanying disadvantages in the pipe-line, and by its use as a separator a thorough separation of the water and other particles from the steam is effected by utilizing the centrifugal force created by the curve for throwing the particles out and away from the current of steam.

A characteristic feature of the present invention is the means shown for catching the water of condensation accumulated in the pipe leading from the source of steam-supply.

Another important feature of my invention is that very little resistance is offered to the passage through the separator of the rapidly-moving current of steam, while at the same time the current is freed of water and other particles.

Referring to the drawings, it will be seen that all of the parts comprising the separator may be cast integral—that is to say, the nozzles 2 and 3, adapted to be respectively connected with the pipe from the steam-supply and with the pipe to the engine or other apparatus, the receiver 4, the main steam-passage 5, and the chambers, vents, and passages—all as fully hereinafter pointed out.

Part of the wall of passage 5, as 6, is solid, and a part, as 7, is provided with a number of openings, slits, or passages 8, leading from said passage 5 to the receiver 4. The shape, number, and arrangement of these passages 8 may be varied, as shown by the drawings. An inwardly-extending lip or projection 9 is preferably employed for the purpose of assisting in catching particles thrown against the part 7 of the wall.

The rapidly-moving current of steam after it enters the separator is met by the end or skim-ring $5^a$ of the elbow-shaped pipe structure forming the main steam-passage 5. This end $5^a$ is preferably of less diameter than the remaining portion of the passage 5 and is located near the inlet-nozzle. The purpose of this construction is to catch the water formed by condensation in the inlet-pipe, which water slides or drips down the walls of the inlet-pipe, and to deflect it into a chamber 10 out of the path of the steam-current. This end skim-ring or deflector $5^a$ also catches a certain amount of water carried in the steam-current. Small openings or passages 11 lead from chamber 10 to receiver 4 and permit the passage of water, &c., from the chamber to the receiver. The particles not caught in the chamber 10 are driven into the slits, openings, or passages 8 and from thence to the receiver.

A vent 12 permits the steam that may have entered the receiver to return to the main current of steam in the passage 5.

Figure 17:
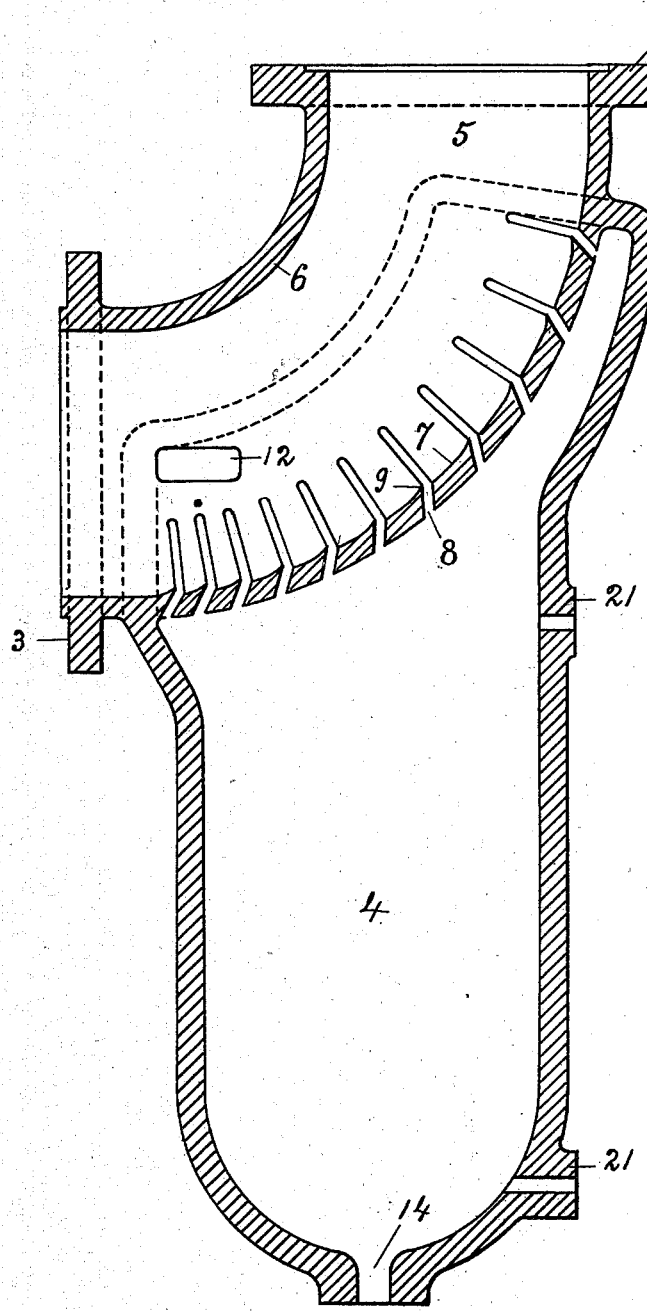

While I have shown several applications of my invention in the several views of the drawings, the same principle is found in all of them. In the form of Figs. 1, 9, and 10 the greater portion of the receiver 4 is located below the main steam-passage, while in the forms of Figs. 8, 11, 14, and 15 the receiver surrounds or partly surrounds the main passage. It may sometimes be desirable to use baffle-plates, and in Figs. 14 and 15 baffle-plates 13 are shown, which may be cast integral with the separator or made separate therefrom and attached, as shown by Fig. 15. In Figs. 14 and 17 I have omitted the chamber 10 and the deflector $5^a$, for in the use of my separator with some boilers, owing to the fact that very little water is carried therefrom in the steam, these parts are not necessary. If it is found desirable, the walls of the main steam-passage may be corrugated, as shown by $13^a$ in Fig. 14.

The receiver or receptacle 4 has an opening 14, through which its contents is discharged into a pipe and conveyed to a steam-trap in the usual manner.

Fig. 16 shows my separator or eliminator employed in connection with an exhaust-pipe leading to a condenser. In this case the oil, grease, &c., which is caught in the receiver 4 passes therefrom through pipe 15 into a vessel 16 and from thence into a pipe 17. In Fig. 1 I have shown an air-chamber 18, which partly surrounds the part 6 of the passage 5. The purpose of this chamber is to keep the wall warm in order to prevent condensation.

The form of Fig. 1 is adapted for coupling a vertical pipe leading into a horizontal pipe. Figs. 8, 9, and 10 show forms designed for coupling two horizontal pipes, and by Figs. 11, 12, and 13 I have shown forms for coupling a horizontal to a vertical pipe.

While it is usually desirable to cast the principal parts of the separator integral, as heretofore stated, it may sometimes be necessary or preferable to make the receiver or part of the receiver separate, as shown in Fig. 10. In this form flanges 19 are provided for attaching the parts by means of bolts. In Figs. 11 and 15 I have shown the part forming the main steam-passage 5 made independent of the other parts. Flanges 20 are employed for fastening the parts together. The receiver 4 is provided with the usual openings 21, which communicate with a water-gage (not shown) for indicating the amount of water in the receiver.

It will be noticed that the water and other particles separated from the steam are at once led away from the main current of steam and will not be again taken up by the rapidly-moving current; also, that the construction of my separator is such as to permit of the utilization of centrifugal force for discharging the particles from the steam at the point or points where it is most effectual.

The efficiency of my invention, its simplicity in construction, and the low cost of manufacture it is believed will be readily appreciated by those skilled in the art.

Having thus described my invention, what I claim is—

1. In a separator, inlet and outlet nozzles, an elbow-shaped main steam-passage having openings, or slots, in the wall thereof, a deflector or skim-ring near the inlet-nozzle, a receiver for water and other particles, the slots, or openings, leading from the main steam-passage to the receiver, substantially as set forth.

2. In a separator, inlet and outlet nozzles, an elbow-shaped main steam-passage, a receiver for water and other particles freed from the current of steam in communication with the main steam-passage, and a chamber or space adjacent to the inlet-nozzle, substantially as set forth.

3. In a separator, inlet and outlet nozzles, an elbow-shaped steam-passage having openings on the wall thereof and in communication with a receiver, a chamber adjacent to the inlet-nozzle, and a deflector or skim-ring near the inlet-nozzle, substantially as set forth.

4. In a separator, inlet and outlet nozzles, a main steam-passage comprising a tubular structure one end of which is formed as a deflector, or skim-ring which projects into the current of steam, a chamber for water and other particles caught and deflected by the deflector, or skim-ring, substantially as set forth.

5. In a separator, inlet and outlet nozzles, an elbow-shaped main steam-passage having inwardly-extending lips or projections, and openings in the wall thereof, a receiver for water and other particles freed from the steam in communication with the steam-passage, a deflector or skim-ring near the inlet-nozzle, a chamber adjacent to the inlet-nozzle, and openings for the passage of water and other particles from the chamber to the receiver, substantially as set forth.

6. In a separator, inlet and outlet nozzles, an elbow-shaped main steam-passage having openings in the wall thereof for the passage of water and other particles to a receiver, and a vent for permitting the return of steam from the receiver to the main current of steam, substantially as set forth.

In testimony whereof I affix my signature in presence of two witnesses.

CARL W. A. KOELKEBECK.

Witnesses:
EDWARD B. VAILL,
W. G. DOOLITTLE.